April 14, 1931.   A. WARTIAN   1,800,708
LOCKING DEVICE
Filed Aug. 26, 1929
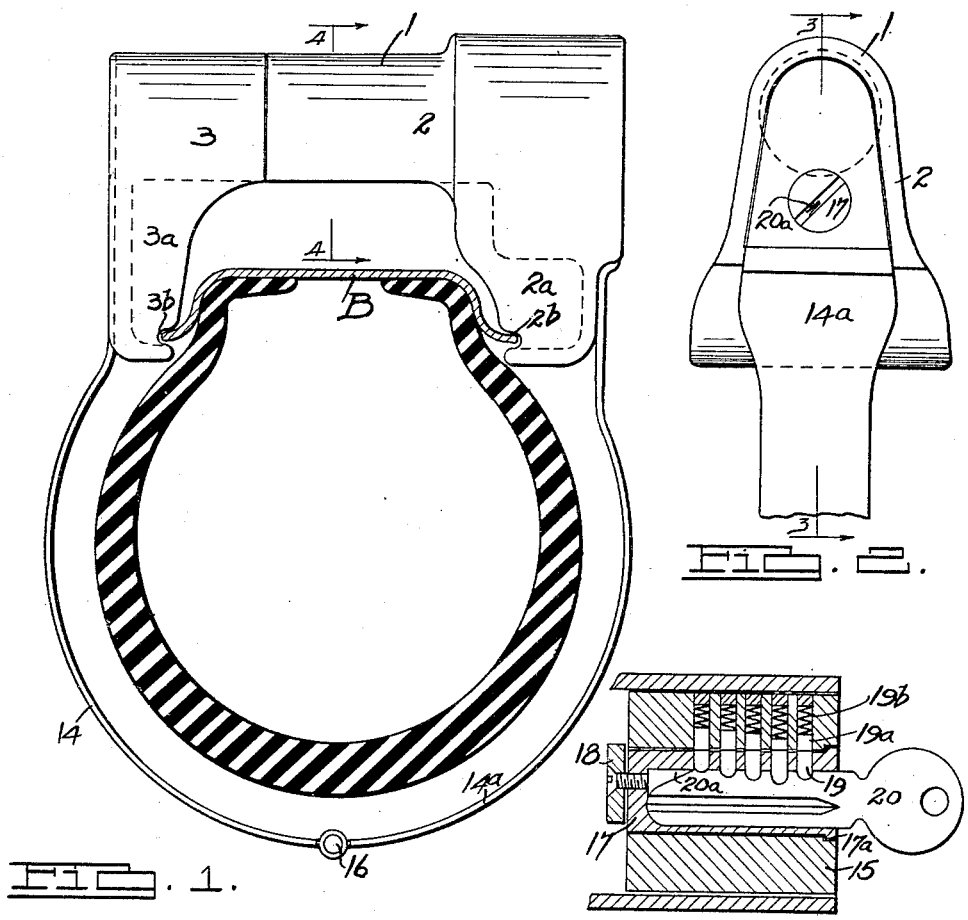
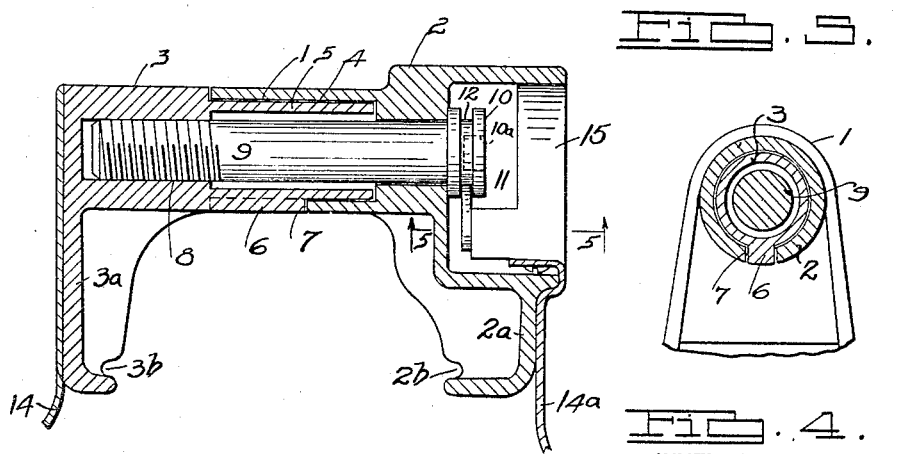
INVENTOR
Avagim Wartian
BY
ATTORNEY Patented Apr. 14, 1931

1,800,708

UNITED STATES PATENT OFFICE

AVAGIM WARTIAN, OF DETROIT, MICHIGAN

LOCKING DEVICE

Application filed August 26, 1929. Serial No. 388,285.

It is an object of this invention to provide a locking device consisting of a cross member having the extremities of a loop mounted on its ends; one extremity of the loop being permanently secured to one end of said cross member, and the other extremity of the loop being provided with a lock to engage portions within the other end of the cross member and hold it securely thereto. Moreover the loop is made in two portions pivotally connected so that it may be readily passed through or around an object to be held.

Another object of the invention is to provide such a locking device wherein the cross member consists of two portions in slidable engagement, and having means for holding the two portions together which cannot be released until the removable extremity of the loop is disengaged from its end of the cross member.

A further object of the invention is to provide each portion of the cross member with an opposed projection towards its outer end and transverse grooves on the inner sides of said projections to engage opposite sides of an article to be held.

With these and other objects and advantages in view which will become apparent as the specification proceeds, the invention is hereinafter more fully described with the aid of the accompanying drawings, in which:

Figure 1 illustrates a front elevation of the invention showing a section of a wheel rim held thereby.

Figure 2 is a partial end view of the invention.

Figure 3 is a section on the line 3—3 of Figure 2.

Figure 4 is a section on the line 4—4 of Figure 1.

Figure 5 is an enlarged section on the line 5—5 of Figure 3.

Referring to the drawings, 1 designates a cross member consisting of two portions 2 and 3. The former is tubular for its entire length and is counterbored at its inner end 4 to receive an inwardly projecting sleeve 5 integral with the portion 3. The portions 2 and 3 are held against independent rotation by means of a tongue 6 integral with the portion 3 which engages a corresponding recess 7 in the portion 2. In the portion 3 a threaded opening 8 is provided concentric with the sleeve 5, and 9 indicates a bolt which extends from a chamber 11 in the outer end of the portion 2 through the said sleeve 5 and engages the threaded opening 8. The head 10 of the bolt 9 is provided with an annular recess 12 for a purpose hereinafter set forth.

At the outer ends of the portions 2 and 3 opposed projections 2a and 3a are provided which have transverse grooves 2b and 3b respectively formed across their inner sides to receive opposed marginal portions of a wheel rim B.

One extremity of a loop 14 is welded or otherwise secured to the outer end of the portion 3 of the cross member 1, and its opposite end is provided with a closure plate 15 which fits into the outer end of the chamber 11. Intermediately of its length the loop 14 is provided with a hinge 16 so that the portion 14a on which the closure plate 15 is secured may be swung about the said hinge 16.

In the closure plate 15 a plug 17 is rotatably arranged. The latter is held against axial movement as by an enlargement 17a at its outer end and by an eccentric latch 18 secured to its inner end. The plug may be held against unauthorized rotation in any known manner as, for instance, by the provision of tumbler pins 19, tumbler extensions 19a and springs 19b, so that it may only be turned with a proper key as the one indicated at 20 for which a key slot 20a is formed in the said plug.

When the key 20 is turned to locked position the plug 17 and latch 18 are so positioned that the latter engages the annular recess 12 in the bolt head 10, thereby holding the loop portion 14a immovable.

When it is desired to remove the wheel rim B, it is first necessary to turn the key 20 so that the latch 18 is disengaged from the bolt head recess 12, and then to turn the loop portion 14a about the hinge 16 thereby removing the closure plate 15. The bolt 9 must then be turned so that its threaded end becomes disengaged from the threaded opening 8 in the portion 3. When the bolt has been removed the two portions 2 and 3 may be separated and the wheel rim B removed. Obviously the bolt head 10 may be provided with any desired means for turning it, in the present instance it is provided with a multi-sided axial aperture 10a for a plug wrench.

While in the foregoing the preferred embodiment of the invention has been described and shown, it is understood that the construction is susceptible to such alterations and modifications as fall within the scope of the appended claims.

What I claim is:

1. In a locking device, the combination of a cross member consisting of two pieces in slidable engagement, one of said pieces being tubular for its entire length and having an enlarged cavity formed at one end, a bolt having its head in said cavity, extending through that piece of the cross member and in threaded engagement with the other cross member piece, a loop consisting of two portions pivotally connected, one extremity of said loop being secured to said other cross member piece, a locking means on the other extremity of said loop adapted to be held in said cavity and to engage the head of said bolt and hold it against axial movement, means for preventing independent rotary movement of said cross member pieces, and opposed projections on said cross member pieces having transverse grooves formed across their inner sides adapted to grip the margins of an article to be held.

2. In a locking device, the combination of a cross member consisting of two pieces in slidable engagement, one of said pieces being tubular for its entire length and having an enlarged cavity at its outer end, a bolt having its head in said cavity, extending through that piece of the cross member and being in threaded engagement with the other cross member piece, a loop consisting of two portions pivotally connected, one extremity of said loop being secured to said other cross member piece, and a locking means on the other extremity of said loop adapted to be held in said cavity and engage the head of said bolt to prevent its axial movement.

3. In a locking device, the combination of a two-piece cross member, said pieces being in slidable engagement, one of said pieces being tubular for its entire length and having an enlarged cavity at its outer end, a bolt having its head in said cavity, extending through the tubular piece of said cross member and being in threaded engagement with the other piece, said bolt head having an annular recess around it, a loop consisting of two pivotally connected portions, one portion being secured to the other piece of said cross member, a locking means on the other extremity of said loop, a latch on said locking means adapted to engage the annular recess in said bolt head, and said locking means being adapted to enter said cavity.

4. In a locking device of the character described, the combination of a member tubular for its entire length and having an enlarged cavity formed therein from one end, a second member having its inner portion axially slidable into the end of the first named member remote from said cavity, a fastening member the head of which rests in said cavity, said fastening member extending through a part of the tubular portion of said member and engaging said second member, a plug in said cavity, a latch rotatable on said plug adapted to engage said fastening member and hold the latter against axial movement, and opposed projections on the outer ends of said members having opposed grooves formed in their inner sides so that an object may be held between them.

5. In a locking device of the character described, the combination of a member tubular for its entire length and having an enlarged cavity at one end into which the tubular portion opens, a second member tubular at one end, the tubular portion being slidable in said first named member and being internally threaded, means holding the two members against independent rotation, a bolt the head of which rests in said cavity, said bolt extending through said first named member and being in threaded engagement with the internally threaded portion of the second member, an annular groove formed around said bolt head, a plug in said cavity, a latch rotatable in said plug adapted to engage said annular groove to hold the bolt against axial movement, and projecting portions on said members having opposed grooves formed in their inner sides between which an object is adapted to be held.

AVAGIM WARTIAN.